A. W. PHILLIPS.
TRAIL GRADER.
APPLICATION FILED FEB. 18, 1914.
1,132,487.
Patented Mar. 16, 1915.
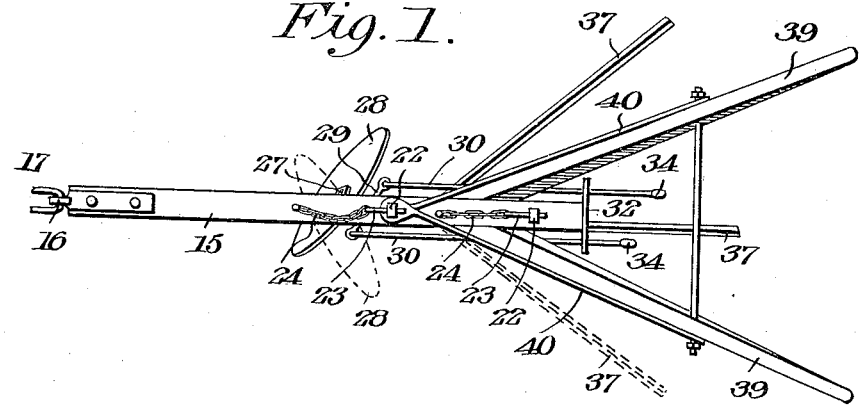
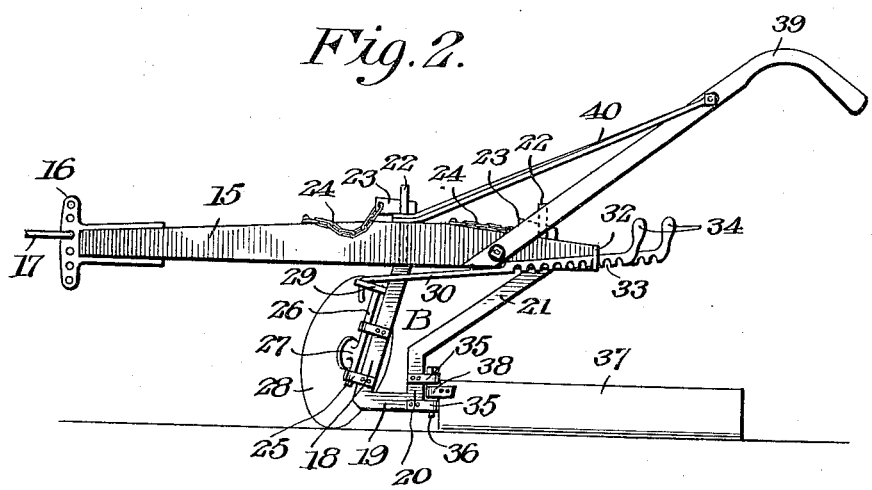
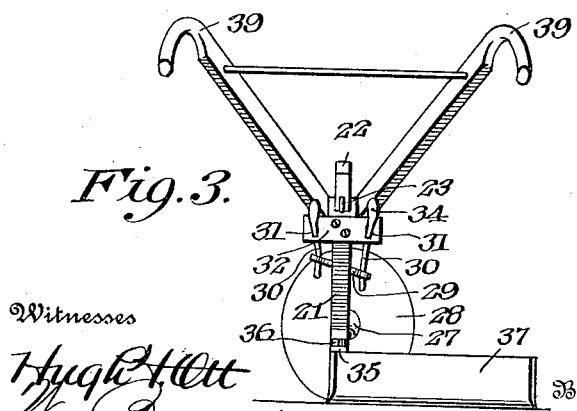
Inventor
A. W. Phillips
By Victor J. Evans
Attorney

UNITED STATES PATENT OFFICE.

ARTHUR W. PHILLIPS, OF PORTERSVILLE, CALIFORNIA.

TRAIL-GRADER.

1,132,487.   Specification of Letters Patent.   Patented Mar. 16, 1915.

Application filed February 18, 1914. Serial No. 819,510.

*To all whom it may concern:*

Be it known that I, ARTHUR W. PHILLIPS, a citizen of the United States, residing at Portersville, in the county of Tulare and State of California, have invented new and useful Improvements in Trail-Graders, of which the following is a specification.

This invention relates to plows and furrow openers, and it has particular reference to a device known as a trail grader.

The invention has for its object to produce a simple and efficient device for grading and leveling trails for the passage of men and animals in rough and mountainous country.

A further object of the invention is to produce a grading device comprising a furrow opener and a land-side member which will automatically adjust itself to the wall of the furrow.

A further object of the invention is to produce a simple and efficient device comprising a reversible furrow opener in combination with a land-side member which will automatically adjust itself to the wall of the furrow.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a device constructed in accordance with the invention, dotted lines being provided to show a different position of the furrow opener and the land-side member. Fig. 2 is a side elevation. Fig. 3 is a rear view. Fig. 4 is a side view of the standard detached from the beam.

Corresponding parts in the several figures are denoted by like characters of reference.

A beam 15 which may be an ordinary straight plow beam is provided at its forward end with a clevis 16 for the attachment of the draft, said clevis being so constructed that the draft link 17 may be adjusted vertically, thereby regulating the depth to which the plow may enter the ground.

The standard member B consists of a frame including the front standard 18, the foot 19, an offset portion 20 extending upwardly at the rear end of the foot, and a brace member 21 extending rearwardly in an upwardly inclined direction from the upper end of the offset portion 20. The standard 18 and the brace member 21 terminate at their upper ends in bolts 22 for the passage of which the beam is provided with suitable apertures. The bolts may be provided with nuts, or they may be vertically slotted for the passage of wedge-shaped keys 23 which, as seen in the drawing, may be connected with the beam by chains 24 to prevent loss.

The standard 18 is provided with forwardly extending brackets 25 constituting bearings for a shaft 26 having a spindle 27 on which a furrow opening disk 28 is mounted for rotation; ball bearings of well known construction being preferably used to facilitate the rotation of the disk. The shaft 26 is provided with a cross bar 29 for the pivotal attachment of the front end of a pair of rods 30, the rearward ends of which are guided through slots 31 in a cross piece 32 on the rear end of the beam, said rods being provided with notches 33 which by engaging the lower edge walls of the slots will serve to maintain the parts in adjusted position. The rods 30 are also provided with handles 34 to facilitate the manipulation thereof. It will be seen that by proper manipulation of the rods 30, the furrow opening disk may be swung to either side so as to serve for turning the soil toward the right or left, as may be desired.

The offset portion 20 of the standard member is provided with rearwardly extending brackets 35 which are apertured for the passage of a bearing member of a pin 36 on which the land-side member C is pivotally mounted. Said land-side member consists of a V-shaped cutting or scraping member comprising two blades 37 which are joined together along the vertical front edges thereof, being provided at the front edge with a bearing sleeve 38 to engage the pin 36. The blades 37 diverge rearwardly at any desired angle with respect to each other.

Handles 39 are pivoted on the side faces of the beam 15 near the rear end thereof, and said handles are reinforced by braces 40.

In the use of the improved trail grader, the furrow opening disk 28 will cut into the ground, turning a furrow slice, and the scraper C following in rear of the furrow opener will swing to one side, causing one of the blades 37 to follow the wall of the furrow, while the other blade moves the dirt from the bottom of the furrow in an outward direction, thus leaving the surface smooth and unobstructed. By simply shifting the position of the furrow opener, the furrow slice may be turned in either direction, and the scraper or land-side member will automatically accommodate itself to such change.

The improved implement is useful for a variety of purposes, for instance, for grading horse or foot pads in mountainous country; also for terrace work, for plowing fire lines, for fighting fire and for other purposes which will readily suggest themselves.

One particular object of the device is the simple construction which enables the device to be knocked down or disassembled for convenience in transportation, since by simply removing the keys 23 the standard may be separated from the beam; the rods 30 may be readily unhooked or detached, as well as the braces 40. The handles 39 may be folded forward down upon the beam, and the V-shaped scraper or land-side member may be detached by simply removing the pin 36. When the device is thus dismantled, the parts thereof may be very easily and compactly packed for transportation in rough country to the point where its services are needed.

Having thus described the invention, what is claimed as new, is:—

1. In a device of the class described, a beam, a frame including a standard, a substantially vertical offset in rear of said standard, and a brace extending rearwardly from the offset, said standard and brace being directly connected with the beam, a shaft supported for rocking movement on the standard and having a spindle, a furrow opening disk journaled on the spindle, means for rocking the shaft and for retaining it to present the disk in various positions and at various angles with respect to the beam, and a V-shaped scraper connected pivotally with the offset portion of the frame.

2. In a device of the class described, the combination with a beam, of a frame including a slightly inclined standard, a foot portion, an offset extending upwardly from the foot portion, and an inclined brace extending rearwardly from the offset, said standard and brace having bolt members engaging the beam, in combination with a disk carrying shaft supported for rocking movement on the standard, and a V-shaped scraper connected pivotally with the offset of the frame.

In testimony whereof I affix my signature in presence of two witnesses.

ARTHUR W. PHILLIPS.

Witnesses:
L. H. FAILING,
A. R. PARSONS.

Copies of this patent may be obtained for five cents each, by addressing the "Commissioner of Patents, Washington, D. C."